July 19, 1966  M. BETHEA, JR  3,261,582

CONDUCTOR CABLE SUSPENSION CLAMP

Filed Sept. 2, 1965  4 Sheets-Sheet 1

INVENTOR.
Malcolm Bethea, Jr.
BY Jennings, Carter & Thompson
Attorneys

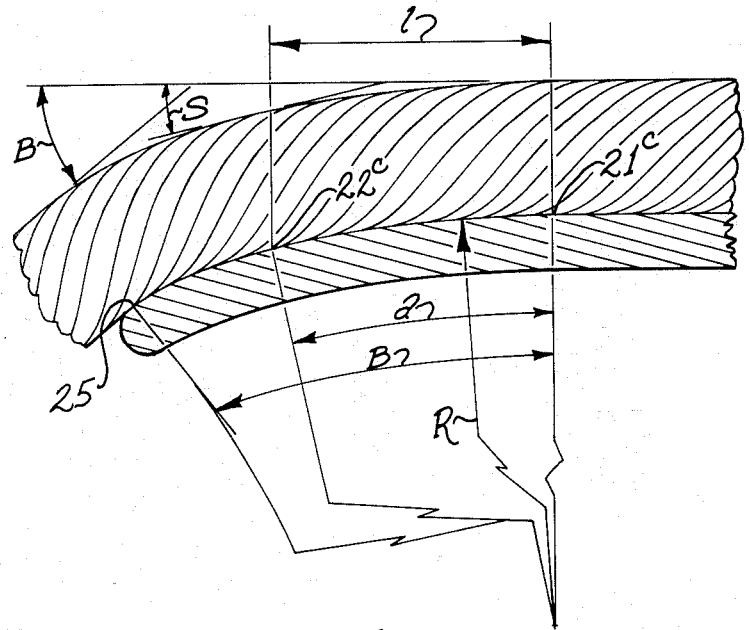
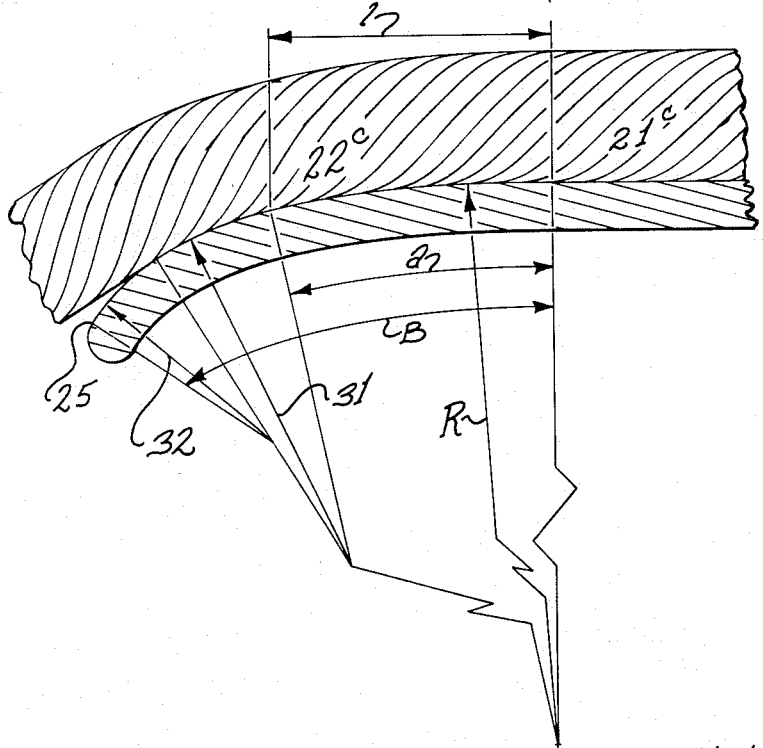

July 19, 1966　　　M. BETHEA, JR　　　3,261,582
CONDUCTOR CABLE SUSPENSION CLAMP
Filed Sept. 2, 1965　　　　　　　　　　4 Sheets-Sheet 4

INVENTOR.
Malcolm Bethea Jr.
BY Jennings, Carter + Thompson
Attorneys

United States Patent Office 3,261,582
Patented July 19, 1966

3,261,582
CONDUCTOR CABLE SUSPENSION CLAMP
Malcolm Bethea, Jr., P.O. Box 1407, Birmingham 1, Ala.
Filed Sept. 2, 1965, Ser. No. 489,786
5 Claims. (Cl. 248—63)

This application is a continuation-in-part of my copending application, Serial No. 402,461, filed October 8, 1964, and entitled Conductor Cable Suspension Clamp.

This invention relates to a conductor cable suspension clamp, and more particularly to such a clamp that is particularly adapted to support high tension conductor cables and prevent failure thereof at the clamp.

In the art to which my invention relates a major problem often encountered is structural failure of the conductor cable at the clamps which secure the cable to the suspension assembly. Heretofore this failure has been attributed to fatigue resulting from bending stresses due to vibration, wind motion and the like. Accordingly, prior attempts to prevent this failure generally have been directed to means to reduce such bending stresses and their causes through the use of dampers, armor rods, and the like.

In view of the foregoing it is a primary object of my invention to provide a clamp for conductor cables in which the supporting area is of sufficient size to reduce the load per unit area below a predetermined maximum value dependent upon the diameter of the cable and the material of which the cable is made.

Another object of my invention is to provide a conductor clamp of the character designated in which the radius of the load supporting area is of a predetermined magnitude dependent upon the tension in the cable, the diameter of the cable and the maximum load per unit area allowable for the given cable material.

A further object of my invention is to provide a clamp of the character designated which will protect the portion of the cable that engages the clamp from damage in service.

I have discovered that failure of conductor cables at the suspension clamps occurs at points of excessive bearing pressures. Bearing pressures encountered with typical prior art cable clamps are often found in the range of 1,000 to 3,000 pounds per square inch of conductor surface area. Bearing pressures of this magnitude cause the strands of the conductor to press against each other where they cross, particularly in the lower layers of the cable that rest upon the clamp. This pressure between the strands causes these strands to nick each other. Upon subsequent motion of the conductor the strands move relative to each other and the nicks act as stress raisers which cause ultimate fatigue failure of the strands at the points where they cross each other, and thus lead to failure of the cable as a whole.

Briefly, my invention comprises a clamp provided with a curved load bearing surface of a size such that the load supported per unit area of the bearing surface is less than a predetermined maximum value which is dependent upon the diameter of the cable to be supported and the material of which the cable is made. To determine the size of the curved load bearing surface I first determine the maximum bearing load that can be applied by one strand when it crosses another strand without damage to either. Having determined this value and knowing the number of strands crossing per square inch of conductor surface in a given conductor, I calculate the maximum bearing load per square inch that the given stranded conductor can safely tolerate. In practice, I use the projected area of the conductor rather than the true surface area of the conductor, because the strand crossings on the sides of the conductor are only partially effective in carrying the vertical load of the cable. Having determined the maximum allowable unit load, and knowing the maximum axial tension that will be in the cable and the diameter of the cable, I compute the radius of the curve of the supporting area from the formula $$R = \frac{T_{max}}{L_a D}$$

in which R is the radius of the curve of the supporting area, $T_{max}$ is the maximum axial tension in the cable resulting from ice, wind, temperature, initial stringing tension, etc., $L_a$ is the maximum permissible vertical, or normal, unit load, and D is the diameter of the cable. It will be understood that under the maximum tension and load conditions for which R is computed, the cable assumes a definite position between its supports, defining by its position a catenary curve. It will be understood that where a suspension turn is made the angle of the turn affects the angle between the conductor center line and the clamp center line. This resultant angle is easily determined but for purposes of simplifying this discussion it will be assumed that reference herein is made to a suspension point with no turn in the line so that the center line of the clamp is horizontal to the ground. Thus, the angle from the horizontal made by a tangent to the curve of the cable at the point that the cable actually leaves the clamp surface; that is to say, the sag or departure angle, has a definite value for the maximum tension and load conditions for any given cable. With this in mind, and further taking into account the fact that under conditions of less tension and load, the sag angle may be greater than under the maximum tension and load conditions, as for instance might occur at high temperatures, I provide a primary bearing load surface with a radius R that is subtended by an angle equal to the sag angle at maximum tension and further, I provide a secondary support surface outwardly of this load bearing surface that curves with a lesser radius than R. Under certain circumstances, the outer support surface may have a continuously decreasing radius that is less than R, or it may curve with a radius less than R for a given distance and then curve with a radius still less than the just mentioned radius for a given distance, and so on.

In describing my invention, and in developing the derivation of the formula above, reference will be made to the accompanying drawings illustrating embodiments of my invention and which form a part of this application, and in which:

FIG. 6 is a diagrammatic vertical section of one end of my clamp taken along the longitudinal axis of the conductor cable and showing the embodiment in which a secondary support surface is provided with a continuously decreasing radius;

FIG. 7 is a diagrammatic vertical sectional view of one end of my clamp taken along the longitudinal axis of the conductor cable and showing the embodiment in which the secondary support surface has two radii, one less than the other;

Figure 1:
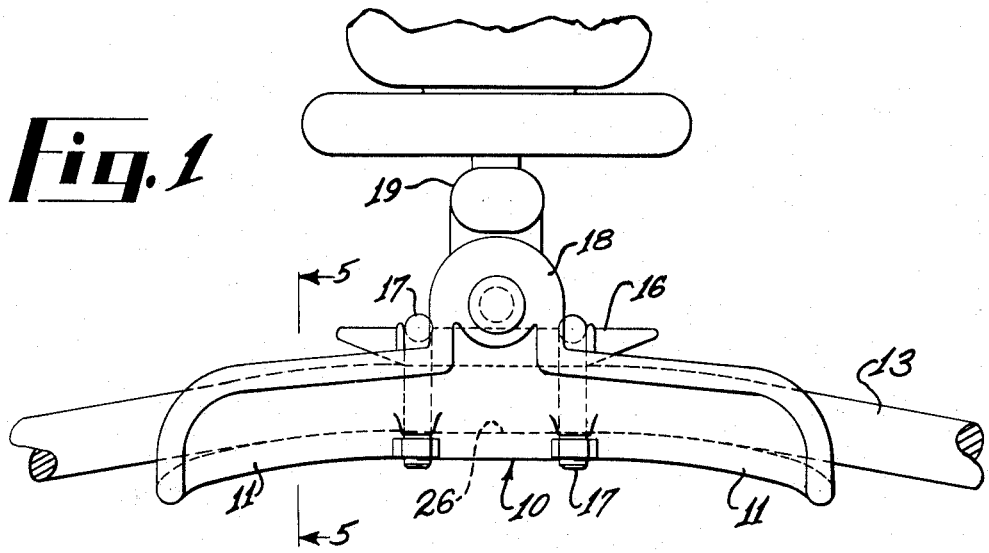
FIG. 1 is a side elevational view of my clamp.
Figure 5:
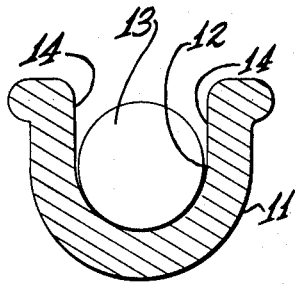
FIG. 5 is a sectional view taken generally along the line 5—5 of FIG. 1, with the cable shown diagrammatically and engaging the groove with a snug fit.

As shown in FIG. 1, my clamp comprises a main body portion 10 having outwardly and downwardly curved end portions 11. The cross section of the body portion of the clamp and the end portions 11 is substantially as shown in FIG. 5, the clamp being shaped with a groove 12 in which a cable 13, shown diagrammatically in FIG. 5, fits snugly. The side walls 14 of the groove secure the cable against lateral movement relative to the clamp. A follower member 16 is secured by U-bolts 17 in position over the cable 13, thus to clamp the cable to the body of the clamp. Upstanding ears 18 may be provided on the main body portion 10 to provide means for securing the clamp to the rest of the suspension assembly shown generally at 19.

The load supported by each end of the clamp is primarily the component of the axial tension in the cable that is perpendicular to the clamp center line. This vertical component is the product of the axial tension resulting from the various load components and the sine of the sag or departure angle, that is to say, the angle from the center line made by a tangent to the curve of the cable at the point at which the cable actually leaves the clamp surface. It should be noted that the term "horizontal" when used herein refers to the center line of the clamp which is usually in fact horizontal. However, as previously mentioned, at suspension turns the whole suspension assembly swings sideways and the sag, or departure, angle is referred to the center line of the clamp whether or not such center line actually be horizontal with reference to the ground. Also, when the suspension points at each end of a span are not at the same elevation the center line of the clamp is not horizontal but, here again, the effect is well known and the terms "horizontal" and "clamp center line" are used interchangeably even though in many instances the center line of the clamp is not horizontal with reference to the ground. This angle is indicated at S in FIG. 2, the axial tension being indicated by the vector T and the vertical component or load supported by the clamp being indicated by the vector $L_v$. This vertical load is supported on the curved portion of the clamp only, it being clear that $L_v$ is zero at the flat portion 26 of the clamp. Thus the total load of the cable on the clamp is supported in an area between a point 21 where the curvature of the cable commences and the point 22 where the cable leaves the surface of the clamp. This area is the product of the distance $l$ between the points 21 and 22 and the diameter of D of the cable. (See FIG. 2.)

Figure 3:
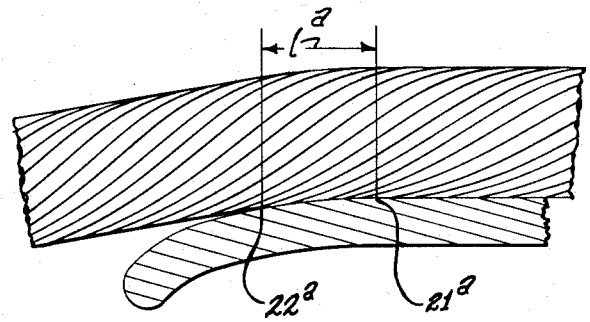
FIG. 3 is a diagrammatic vertical sectional view of a typical prior art clamp taken along the longitudinal axis of the conductor cable.

A typical prior art clamp is shown in FIG. 3. Referring to FIG. 3, it is seen that the point where the cable begins to curve is indicated at $21^a$ and the point where the cable actually leaves the clamp is indicated at $22^a$. The distance $l^a$ between the points $21^a$ and $22^a$ is quite short, as shown, prior art clamps being designed under the assumption that the support is largely in the center portion of the clamp. I have discovered, however, that as described above the greater portion of the support of the cable occurs in the curved area of the clamp.

Figure 4:
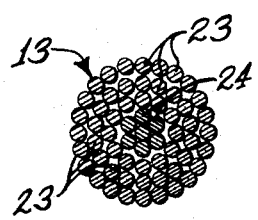
FIG. 4 is a cross sectional view of a conductor cable of a type which with the subject clamps are used.

Thus it is seen that in prior art clamps the entire load must be supported over a relatively small area. This leads to a very high load per unit area concentration intermediate the points $22^a$ and $21^a$. When the force per unit area exceeds the maximum bearing load per unit area that the given stranded conductor can tolerate, the strands of the cable deform. In FIG. 4 I show a cross section of a typical conductor cable having 54 aluminum strands indicated generally by the numeral 23 and seven steel core strands indicated by the numeral 24. When the vertical load of the cable against the clamp exceeds the maximum bearing load described above, the strands of the cable, particularly those in the lower two layers, press into one another where they cross, thus causing deformation of the strands of the cable. These deformations, or nicks, are in themselves weakened points in the cable. Furthermore, this excessive load increases the frictional wear of the strands as they move relative to one another in response to expansion and contraction of the cable and the swaying of the cable by the wind and the like. Thus, too great a load per unit area of support surface causes severe damage to the cable and leads to its eventual failure.

Figure 2:
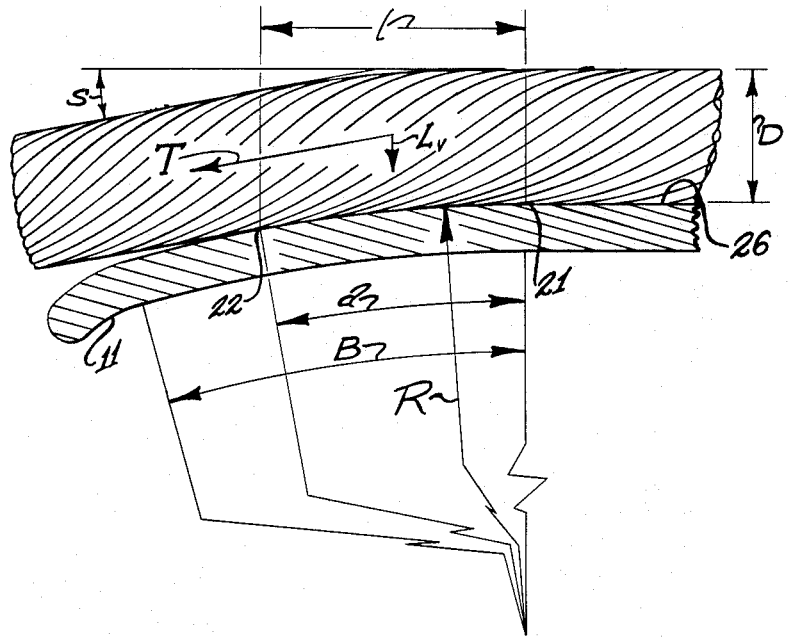
FIG. 2 is a diagrammatic vertical section of one end of my clamp taken along the longitudinal axis of the conductor cable.

In order to distribute the load $L_v$ over a sufficient area to reduce the load per unit area below the critical value at which damaging deformation and wear in cable strands occurs, the distance $l$ must be increased. However, geometric principles show that the support angle $a$ in FIG. 2 is equal to the angle S in FIG. 2. That is to say, the support angle $a$ is equal to the sag angle S at the point of departure of the cable. Thus, to increase $l$, the radius of curvature R of the support area must increase. The distance $l$ may be computed as the product of the radius R and the sine of the angle S, angle $a$ being equal to angle S. From the foregoing we have:

(1) $$R = \frac{l}{\sin S}$$

(2) $$A = lD$$

(3) $$L_v = T_{max} \sin S$$

The load per unit area $L_a$ carried by the bearing surface between the bearing points 21 and 22 is the quotient of the vertical load divided by the area, that is to say:

(4) $$L_a = \frac{L_v}{a}$$

or (4a) $$L_a = \frac{T \sin S}{lD}$$

Solving equation (4a) for $l$ and substituting in Equation 1, we obtain:

(5) $$R = \frac{T_{max}}{L_a D}$$

Equation 5 states, in effect, that the required radius of curvature of the supporting surface or bearing surface of the clamp is directly proportional to the maximum axial tension in the cable, inversely proportional to the diameter of the cable, and inversely proportional to a given load per unit area. It is this load per unit area $L_a$ which is critical in preventing damage to the cable. I have found that loads in excess of 700 pounds per square inch cause extensive damage to the strands of an aluminum cable, and that best results are obtained when the maximum load per unit area for an aluminum cable is in the range of 300 to 700 pounds per square inch. I have found that a maximum unit bearing load of 470 pounds per square inch is a safe design load to use for most commonly used stranded aluminum electrical conductors such as the one described above. Substituting this value for the parameter $L_a$ in the Equation 5 gives:

(6) $$R = \frac{T_{max}}{470D}$$

As a specific example of a clamp made in accordance with my invention, I recite the following:

For a 954 MCM cable having fifty-four aluminum strands and seven steel strands, with an axial tension computed as 20% of a breaking force of 26,900 lbs., with a sag angle specified as 10°, the total vertical load amounts to 935 pounds. The radius required to distribute this 935 pounds over a sufficient area to prevent damage to the cable is computed from Formula 6 to be approximately 11 and 11/16 inches, giving a distance between the points 21 and 22 of approximately two inches.

In the foregoing computations, it is seen that the trigonometric term cancels out. However, to produce the proper area for supporting the maximum load, the arc of the supporting surface must be subtended by the angle S.

In view of the fact that the radius R is computed for maximum load conditions, that is to say $T_{max}$ in the equation is the maximum axial tension that the cable is to experience, all other load conditions are therefore less, and the curved support surface required is less than that provided by the support surface which curves with the radius R through angle S. Under certain conditions, such as under greatly increased temperature conditions, the axial tension of the cable decreases, and even though some of the maximum loading factors, such as ice or wind, may be absent, the cable elongates substantially thus increasing the sag angle above the angle at maximum tension. Under these and similar conditions, it is necessary to provide an additional curved load bearing surface which is subtended by an angle equal to the increase in sag or departure angle. However, under these conditions the unit loads to be supported are less than the maximum unit load for which the clamp is designed, and therefore the additional support surface may curve more sharply, that is to say, with a lesser radius than R.

It will be understood, of course, that when a clamp has both gentle and sharply curved surfaces the unit loads supported on the more sharply curved surfaces are greater than the unit loads supported by the relatively flat surfaces. Therefore, the proportional part of the load carried by the portion 25–22c of the clamp shown in FIG. 6 will be proportionately greater than the load supported by the portion 22c–21c. However, since the total load to be supported is less than the maximum load for which the clamp is designed, I can choose a radius considerably less than R and yet not subject the cable to damaging excessive loads per unit area under the greater sag conditions.

The value of the radius chosen for the second support surface may be constant, or it may, as shown in FIG. 6, vary continuously from some value less than R to a still smaller value. In the embodiment shown in FIG. 7 I show the secondary support surface as having two radii, the radius 31 which is adjacent the primary support surface being greater than the outermost radius 32.

The purpose in using secondary radii, where applicable, at the two ends of the clamp is to keep the clamp as short as possible, for cost reasons, yet still meet the requirement of keeping the bearing loads at a safe figure under all conditions.

From the foregoing, it is seen that I have devised a new and improved clamp for conductor cables and the like which is particularly adapted for preventing damage to the cable resulting from excessive bearing loads per unit area in the support area of the clamp. The relatively long distance $l$ which results from the relatively large radius R gives the clamp a much greater load bearing surface than heretofore provided. By constructing the clamp with a lip angle B shown in FIGS. 2, 6, and 7 considerably greater than the sag angle S at maximum axial tension, I provide a clamp suitable for a wide range of conditions. Furthermore, by providing a more sharply curved outer or secondary support surface, I provide a relatively short inexpensive clamp which is adapted for a wide range of conditions, and yet gives adequate support for the cable under maximum load conditions.

The clamp is generally provided with a relatively flat central portion indicated at 26, FIGS. 1 and 2, which carries no load from the tension of the cable. Accordingly, with the follower 16 pressing the cable only against the flat portion 26, the force supplied by the follower 16 is effective only in this area on the cable, thus allowing greater clamping forces because the clamping forces do not add to the vertical components of the tension in the cable. Also, relatively large clamping forces in 26 will not damage the cable due to the fact that there is little movement of the cable adjacent the flat central portion 26.

In some cases where clamping forces requirements are low, it might be desirable to carry some of the vertical load on the portion 26. This could be accomplished by curving the portion 26 with a radius greater than R, whereby a proportional part of the load will be carried in the area 26.

Figure 8:
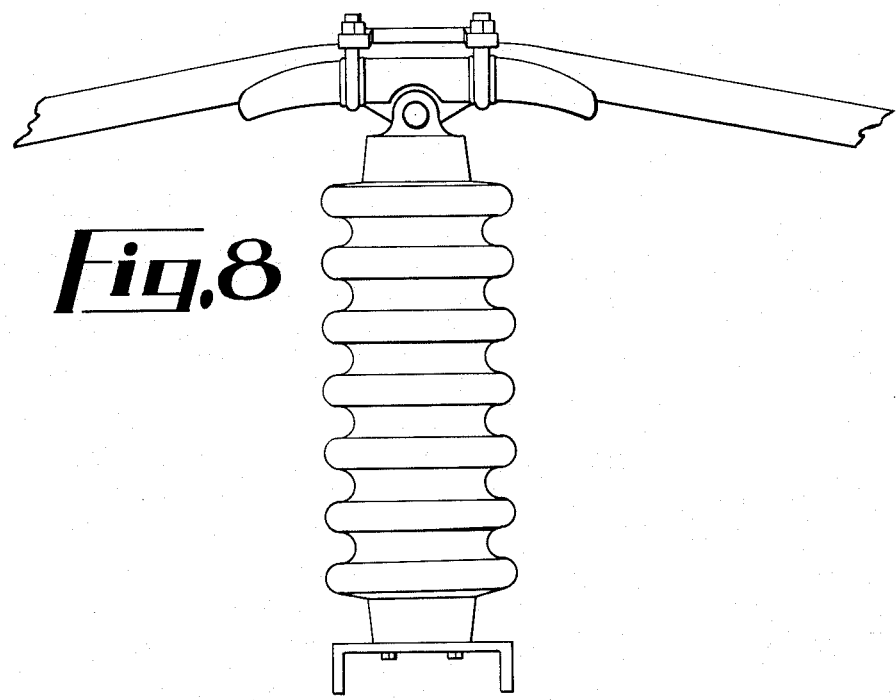
FIG. 8 is a side elevational view of another embodiment of my clamp.
Figure 9:
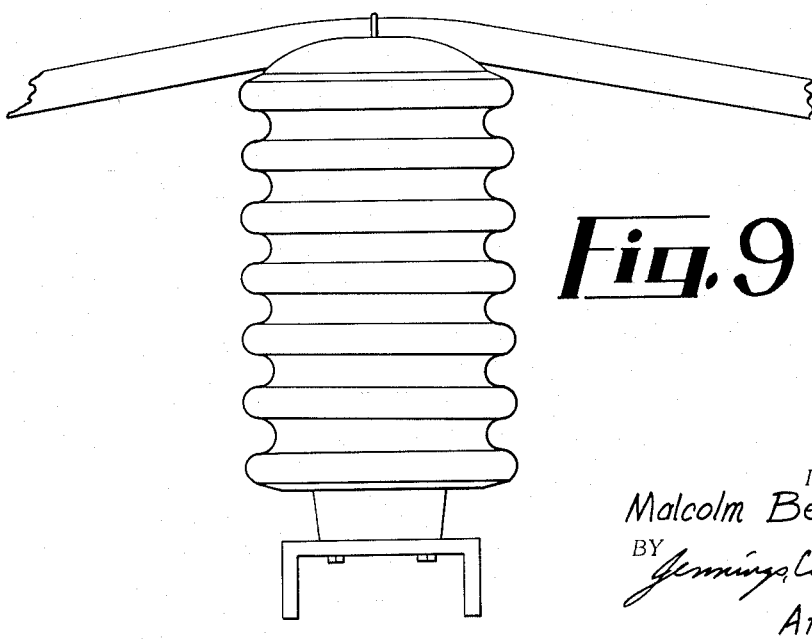
FIG. 9 is a side elevational view of still another embodiment of my clamp.

In FIG. 8 I show an embodiment of my clamp in which the clamp proper is carried as a separate member on top of a porcelain insulation member. In FIG. 9 I show a similar embodiment in which the clamp support portions are formed integrally with the porcelain insulation member.

While I have shown my invention in several forms, it will be obvious to those skilled in the art that it is not so limited, but it suceptible of various changes and modifications without departing from the spirit thereof, and I desire, therefore, that only such limitations shall be placed thereupon as are specifically set forth in the appended claims.

What I claim is:

1. A clamp for supporting conductor cables and the like of a predetermined diameter which comprises a cable support portion having a configuration defined by the equation $$R = \frac{T_{max}}{L_a D}$$

wherein R represents the radius of curvature of the cable support portion, $T_{max}$ represents the maximum axial tension in the cable, and $L_a$ represents the empirically determined maximum allowable load per square inch for the material of the cable and D represents the predetermined diameter of the conductor cable.

2. A clamp for supporting a cable of given diameter which extends outwardly from the clamp to define a sag angle that varies in response to varying tension and load conditions comprising:
 (a) an inner curved cable support portion having a radius defined by the equation $$R = \frac{T_{max}}{L_a D}$$

wherein R represents the radius of the inner curved portion, $T_{max}$ represents the maximum axial tension in the cable, $L_a$ represents the empirically determined maximum allowable load per square inch for the material of the cable and D represents the diameter of the cable,
 (b) the inner curved support portion being subtended by an angle at least as great as the maximum sag angle of the cable under maximum tension and load conditions, and
 (c) an outer curved cable support portion adjacent said first cable support portion of a radius less than the radius of said first cable support portion.

3. A clamp for supporting a cable as defined in claim 2 in which the radius of curvature of the outer curved support portion continuously decreases outwardly from the inner support portion.

4. A cable clamp for aluminum-like conductors having a longitudinally curved bearing surface adjacent at least one end thereof in which the value of the radius of said longitudinally curved surface differs from the ratio of the tension in the cable to the diameter of the cable by a numerical factor having a value in the range of from $\frac{1}{300}$ to $\frac{1}{700}$.

5. A cable clamp as defined in claim 4 in which the value of the numerical factor is approximately the reciprocal of 470.

References Cited by the Examiner

UNITED STATES PATENTS

| | | | |
|---|---|---|---|
| 2,000,652 | 5/1935 | Snyder | 174—169 |
| 2,135,360 | 11/1938 | Taylor | 174—169 |
| 2,879,963 | 3/1959 | Burgess et al. | 248—63 |

FOREIGN PATENTS

| | | |
|---|---|---|
| 636,197 | 4/1950 | Great Britain. |

CLAUDE A. LE ROY, *Primary Examiner.*

J. F. FOSS, *Assistant Examiner.*